April 24, 1934.　　　C. V. JOHNSON　　　1,956,292

GAUGE

Filed March 4, 1931

INVENTOR
C. V. JOHNSON
Joseph K. Schofield
ATTORNEY

Patented Apr. 24, 1934

1,956,292

UNITED STATES PATENT OFFICE 1,956,292

GAUGE

Clinton V. Johnson, Hartford, Conn., assignor to Pratt & Whitney Company, Hartford, Conn., a corporation of New Jersey Application March 4, 1931, Serial No. 520,053

3 Claims. (Cl. 33—199)

This invention relates to gauges and in particular to a gauge adapted to determine the accuracy of the cover clamping projections on glass containers.

An object of the present invention is to provide a gauge which will enable the clamping projections on a jar or other container which are of helicoidal form to be accurately and expeditiously gauged relative to the edge of the opening of the container.

A feature of importance of the invention is that the gauge may have its gauging members moved to independent gauging positions so that when one portion of the gauging member becomes worn another unworn gauging surface may be presented which will properly gauge the articles.

With the above and other objects in view, my invention includes the features of construction and operation set forth in the following specification and illustrated in the accompanying drawing.

In the accompanying drawing annexed hereto and forming a part of this specification I have shown my invention embodied in a form of gauge adapted exclusively for glass jars or containers of well known form having fragmentary helicoidal ridges disposed upon and outstanding from the outside surface of the jar adjacent its open end, but it will be understood that the invention can be otherwise embodied and that the drawing is not to be construed as defining or limiting the scope of the invention, the claims appended to this specification being relied upon for that purpose.

Figure 2:
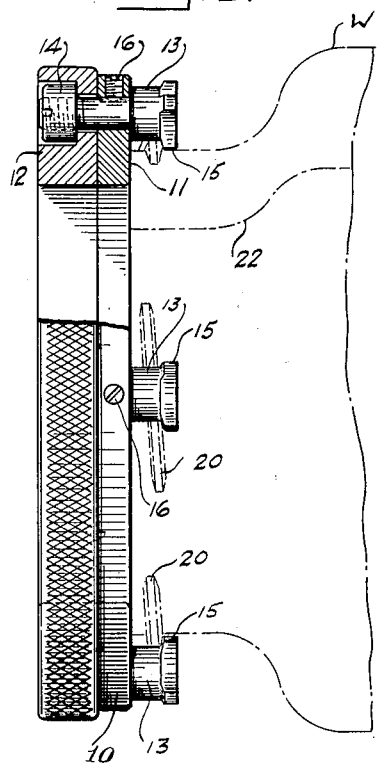
Fig. 2 is a side elevation of a complete gauge shown partly in section.
Figure 1:
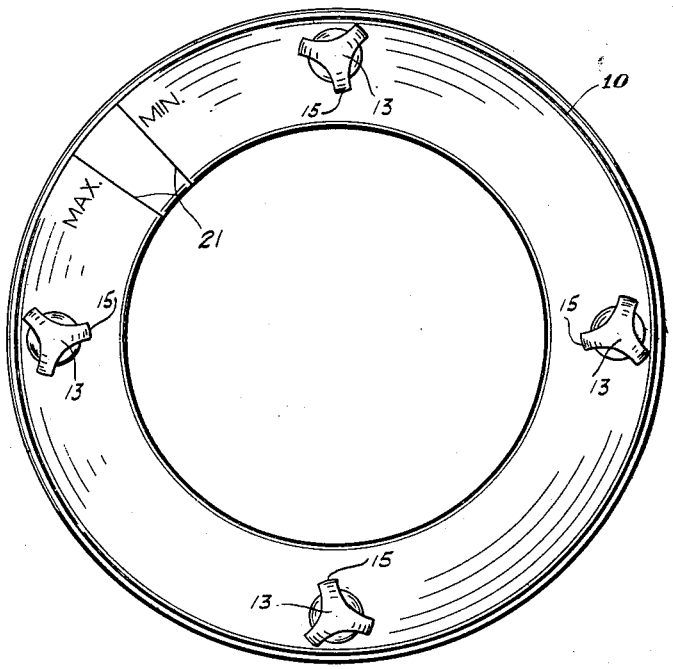
Figure 1 is a plan view of a gauge with the gauging members shown in one of their adjusted rotative positions.

In the above mentioned drawing I have shown two embodiments of the invention which are now deemed preferable, but it is to be understood that changes and modifications may be made within the scope of the appended claims without departing from the spirit of the invention.

Briefly and in its preferred aspect, my invention may include the following principal parts: First, a body member having a plane guaging surface; second, gauging members outstanding from said gauging surface and having overhanging or projecting portions, these portions being either of complete annular form or cut away to form narrow and separated overhanging projections; third, means to hold said gauging members against the gauging surface; and fourth, means to adjust the gauging members individually rotatably and retain them in different predetermined rotative positions.

Referring more in detail to the figures of the drawing, I provide a ring 10 forming a body member for the gauge, one face 11 of which is carefully surfaced to a perfect plane. Adjacent this body member 10 and lying adjacent the face opposite the planed surface 11 may be another ring 12, the peripheral surface of which may be suitably knurled to provide a convenient grasping portion.

Figure 3:
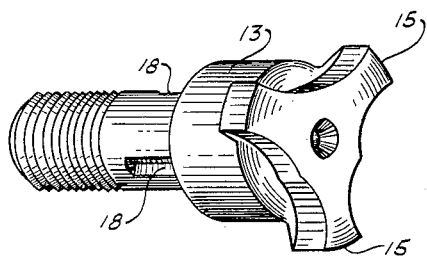
Fig. 3 is a perspective view of one form of gauging member used in the gauge.

Outstanding from the plane surface 11 of the body member 10 are gauging members 13, these members 13 being, as shown, in the form of studs, portions of which may pass through the rings 10 and 12 and be held in place by nuts 14 engaging threaded portions of the gauging members. These nuts 14 are preferably housed within one of the rings 12. The surfaces of the gauging member adapted to engage the parts to be tested comprise projections 15 formed upon the cylindrical surfaces outstanding from the body member 10. These projections, as shown in the preferred embodiment shown in Fig. 3, comprise three equally spaced projections of relatively narrow width. In order to properly position these projections, grooves 18 are cut, as shown in Fig. 3, within the cylindrical portions of the gauging members which may be engaged by a small conically pointed screw 16 threaded into the ring 10 and holding the gauging member 13 against rotation.

Figure 4:
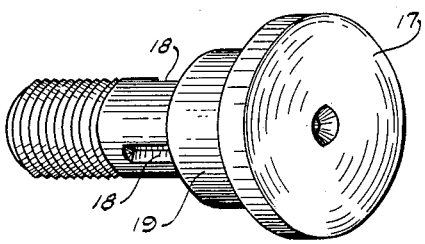
Fig. 4 is a modified form of the gauging member shown in Fig. 3.

In gauging jars of relatively large size, such as indicated in dot-and-dash lines in Fig. 2, having widely separated helical projections, the gauging members 13 may be formed as shown in Fig. 4, the projecting portion 17 being of cylindrical form and of greater diameter than the portion 19 abutting the plane surface of the body member 10.

In operation, after careful adjustment of the gauging members 13, the jar or other member being gauged is placed with its open or mouth end against the plane surface 11 of the ring 10, the projections 15 passing between the clamping ridges or helicoidal projections 20 formed on the outer surface of the neck of the container W. Rotating the jar or container W forces the clamping portions of the inclined ridges or projections 20 to engage the projections 15 on the gauging members 13. Assuming that the jar W has been accurately made, the projections 15 on the gauging members 13 will be disposed substantially as shown in Fig. 2 relative to the clamping projections 20 when the jar W has been rotated as far as possible in its gauging position. For convenience in gauging, witness lines 21 may be provided on the plane surface 11 of the ring 10 so that in gauging position the seam 22 of the container W formed in molding the jar may be inspected with relation to these lines. If the seam or fin 22 formed in the jar during the blowing or molding operation lies between the witness lines 21 formed in the plate 10 when the jar is in its gauging position, the helical projections 20 will be properly disposed relative to the end face of the jar. The sealing caps, usually of metal, adapted for engaging the projections 20 will therefore properly fit over the projections 20 and hold the cap in sealing position. Should the jar W be rotated when in gauging position to a position with the seam 22 on the outer sides of witness lines 21 then the distance of the projections from the end face of the jar will be either more or less than proper for effective engagement with the projections on the sealing cap.

What I claim is:

1. A gauge for interrupted helicoids comprising a base member having a plane gauging surface, witness lines on said gauging surface, gauging members secured to said base member and outstanding therefrom in predetermined positions relative to said witness lines, there being a plurality of extended portions on each of said gauging members whereby said members may engage over the portions being gauged, said gauging members being rotatably adjustable within said base member to bring different extended portions successively into gauging position.

2. A gauge for interrupted helicoids comprising a base member having a plane gauging surface, gauging members secured to said base member against said gauging surface and outstanding therefrom, there being a plurality of extended portions on each of said gauging members, said gauging members being rotatably adjustable to bring different extended portions successively into gauging position.

3. A gauge for interrupted helicoids comprising a base member having a plane gauging surface, gauging members secured to said base member and outstanding therefrom, there being a plurality of extended portions on each of said gauging members spaced equidistant from said gauging surface, said gauging members being rotatably adjustable to different rotative positions to bring said extended portions successively into gauging position, and means to retain said members in adjusted rotative positions.

CLINTON V. JOHNSON.